United States Patent
Patel et al.

(10) Patent No.: US 7,044,377 B2
(45) Date of Patent: May 16, 2006

(54) PLUG-AND-PLAY IMAGING AND ILLUMINATION ENGINE FOR AN OPTICAL CODE READER

(75) Inventors: Mehul Patel, Fort Salonga, NY (US); David Tsi Shi, Stony Brook, NY (US); Thomas D. Bianculli, Manorville, NY (US); Chunyu Zhao, Moriches, NY (US)

(73) Assignee: Symbol Technologies Inc., Holtsville, NY (US)

( * ) Notice: Subject to any disclaimer, the term of this patent is extended or adjusted under 35 U.S.C. 154(b) by 147 days.

(21) Appl. No.: 10/633,061

(22) Filed: Aug. 1, 2003

(65) Prior Publication Data

US 2005/0023351 A1 Feb. 3, 2005

(51) Int. Cl. *G06K 7/14* (2006.01)

(52) U.S. Cl. ............ 235/454; 235/462.11; 235/462.24; 235/462.25; 235/462.41

(58) Field of Classification Search ............ 235/454, 235/462.06, 462.17, 462.42, 462.47, 472.02, 235/462.11, 462.24, 462.25, 462.41
See application file for complete search history.

(56) References Cited

U.S. PATENT DOCUMENTS

| | | | |
|---|---|---|---|
| 3,819,938 A | 6/1974 | Komrumpf et al. | |
| 4,251,798 A | 2/1981 | Swartz et al. | |
| 4,345,308 A | 8/1982 | Mouyard et al. | |
| 4,983,818 A * | 1/1991 | Knowles | 235/462.47 |
| 5,308,966 A | 5/1994 | Danielson et al. | |
| 5,319,182 A | 6/1994 | Havens et al. | |
| 5,561,283 A | 10/1996 | Dvorkis et al. | |
| 5,635,697 A | 6/1997 | Shellhammer et al. | |
| 5,663,551 A * | 9/1997 | Hone et al. | 235/462.45 |
| 5,723,868 A | 3/1998 | Hammond, Jr. et al. | |
| 5,784,102 A | 7/1998 | Hussey et al. | |
| 5,814,827 A | 9/1998 | Katz | |
| 6,024,283 A | 2/2000 | Campanelli et al. | |
| 6,340,114 B1 * | 1/2002 | Correa et al. | 235/462.22 |
| 6,722,566 B1 * | 4/2004 | Drzymak et al. | 235/454 |
| 6,874,690 B1 * | 4/2005 | Lucera et al. | 235/462.4 |
| 2001/0003346 A1 * | 6/2001 | Feng | 235/472.01 |
| 2003/0029917 A1 | 2/2003 | Hennick et al. | |
| 2003/0062413 A1 * | 4/2003 | Gardiner et al. | 235/454 |
| 2003/0213846 A1 * | 11/2003 | Knowles et al. | 235/462.01 |
| 2003/0226895 A1 | 12/2003 | Havens et al. | |
| 2004/0020990 A1 * | 2/2004 | Havens et al. | 235/472.01 |
| 2004/0164165 A1 * | 8/2004 | Havens et al. | 235/462.43 |
| 2005/0001037 A1 * | 1/2005 | Wulff | 235/462.43 |
| 2005/0023352 A1 * | 2/2005 | Patel et al. | 235/454 |

* cited by examiner

*Primary Examiner*—Karl D. Frech
*Assistant Examiner*—Daniel Walsh
(74) *Attorney, Agent, or Firm*—Carter, DeLuca, Farrell & Schmidt, LLP.

(57) ABSTRACT

An imaging and illuminating engine for an optical code reader to illuminate and image remote target indicia, such as an optical code, is provided. The engine includes an image sensor for receiving reflected illumination from the remote indicia and an illumination assembly for providing illumination of the remote indicia. The illumination assembly is capable of providing a plurality of different outputs, such as light having different wavelengths. The illumination assembly can also be provided with a single illuminating device for providing one illumination output for illuminating substantially the entire field of view. A transmissive, optical element overlays the engine for preventing light generated by the illumination assembly from reflecting back towards the image sensor. The imaging engine is an integrated circuit package configured for easily interfacing within an optical code reader as a plug-and-play component.

29 Claims, 4 Drawing Sheets

PLUG-AND-PLAY IMAGING AND ILLUMINATION ENGINE FOR AN OPTICAL CODE READER

BACKGROUND OF THE INVENTION

1. Field of the Invention

This invention relates to imaging in optical code reading devices. Aspects of the invention are particularly useful in solid-state optical code readers for illuminating and imaging remote target indicia, such as an optical code. The present invention is useful in CCD based bar code readers, and other imaging devices.

2. Description of the Related Art

Optical codes are patterns made up of image areas having different light reflective or light emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type. Optical code readers are used in fixed or portable installations in many diverse environments such as in stores for checkout services, in manufacturing locations for workflow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor that is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one-dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference. Another conventional optical code is known as "MaxiCode." It consists of a central finder pattern or bull's eye center and a grid of hexagons surrounding the central finder. It should be noted that the aspects of the inventions disclosed in this patent application are applicable to optical code readers, in general, without regard to the particular type of optical codes, which they are adapted to read. The invention described may also be applicable to some associated image recognition or analysis.

Most conventional laser scanning systems generate one or more beams of laser light, which reflects off a barcode symbol, and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two-dimensional barcodes is disclosed in U.S. Pat. No. 5,561,283 also assigned to Symbol Technologies, Inc.

Typically, a laser beam generated by a laser source, for example, a gas laser tube or a semiconductor laser diode, is optically focused by an optical train into a generally circular laser beam spot on a symbol. The beam spot is swept by a scanning component over the symbol and forms a scan pattern thereon. Laser light reflected off the symbol is detected by a light sensor, e.g. a photodiode, mounted together with the laser source, the optical train, the scanning component, and the photodiode in a housing, preferably one having a handle to enable hand-held, portable operation.

The symbol itself is a coded pattern comprised of a series of bars of various widths, the bars being spaced apart from one another to bound spaces of various widths, the bars and spaces having different light-reflective properties. Although dimensions may vary, depending on the particular application and the density of the symbol, each bar and space of a UPC symbol typically used in the retail industry to identify retail products measures on the order of thousandths of an inch (mils). In practice, the generally circular laser beam spot has a cross-sectional diameter on the order of 6 to 10 mils.

Barcodes can also be read by employing imaging systems having an image sensor and a plurality of illuminating devices for illuminating the field of view. The image sensor generally includes a two-dimensional array of cells or photo sensors which correspond to image elements or pixels in the field of view. The image sensor may be a two-dimensional or area charge coupled device (CCD) and associated circuits for producing electronic signals corresponding to a two-dimensional array of pixel information for a field of view.

Laser scanning and imaging systems generally include a handheld unit that is manually pointed at the target during a scanning or imaging procedure. The handheld unit is often a component of a much larger system including other scanners, computers, cabling, data terminals, etc. Such systems are frequently designed and constructed based on mechanical and optical specifications for the scanning or imaging engine, sometimes called "form factors." One such form factor is the SE900 form factor utilized by Symbol Technologies, Inc.

Accordingly, there is a need to provide a compact imaging engine that can be substituted for conventional laser line scanning engines in currently designed and currently deployed optical code reader systems.

There is another need to provide an imaging engine that can be substituted for predetermined form factor scanning engines, such as the SE900 form factor scanning engine, in currently designed and currently deployed optical code reading systems to increase the reliability, versatility, and target working range of such systems.

SUMMARY OF THE INVENTION

It is an object of the present invention to provide an imaging engine for use with mobile and stationary optical code readers.

It is another object of the present invention to provide an imaging engine that includes an image sensor and an illumination assembly in a modular, integrated circuit package.

It is another object of the present invention to provide an imaging engine that is simple and inexpensive to manufacture.

It is yet another object of the present invention to provide an imaging engine that is fabricated from a semiconductor material wherein the image sensor and illumination assembly are fabricated integrally with a base member to form an integrated circuit package.

Another object of the present invention is to provide an imaging engine where, in its simplest form, includes one illumination assembly having one illuminating device for illuminating an entire field of view of the imaging engine.

According to the above objects, an imaging engine for optical code readers is herein disclosed in accordance with the present invention that is configurable and adaptable for use in mobile and stationary optical code readers. Advantageously, the imaging engine is configured and dimensioned to fit within a predetermined form factor, such as the SE900 form factor.

In a first embodiment, the imaging engine includes a substrate having a base member wherein several components of the imaging engine are placed thereon. An image sensor is located on a face of the base member and is preferably aligned with an optical beam path of the optical code reader. The image sensor may be of a known type, such as a CCD or another suitable detector type, that is selected to cooperate with the imaging engine and, in particular, with an illumination assembly. The illumination assembly is also located on a face of the base member and includes one or more, i.e., at least one, illuminating devices for generating at least one output wavelength. Preferably, the illumination assembly and the image sensor are oriented along the optical beam path of the optical code reader. The at least one illuminating device generates a corresponding number of outputs. These outputs may include visible light and infrared radiation. In its simplest form, the illumination assembly includes one illuminating device for generating one output wavelength for illuminating the entire optical target and generating a reflected light signal that is impinged on the image sensor.

Other configurations include generating a separate targeting beam for aligning the optical code reader with the optical code, and especially, the reflected light signal, generating an output for use in cooperation with a range determining means, or generating an output for use in cooperation with a focusing means.

Internal to the base member are conductive interconnections for transferring signals from the illumination assembly and image sensor to an interface assembly. Recesses are formed on at least one face of the base member for receiving the image sensor and the illumination assembly. Preferably, each recess will include a means for easily inserting or removing the image sensor or illumination assembly, thereby providing an easily configurable imaging engine. In addition, the imaging engine includes a microprocessor cooperatively coupled to each illumination assembly and each image sensor via the interface assembly for controlling the output of each illumination assembly, and for transferring data between the imaging engine and circuitry in the optical code reader.

A substantially transparent optical window is included and covers the recess of each illumination assembly wherein the illuminating devices are substantially flush with the optical window to reduce reflected light when each illuminating device is turned on to generate an output. This optical window may be of unitary construction with an opening configured and adapted to align with the recess of the image sensor thereby covering each illumination assembly, or a number of optical windows that correspond to the number of illumination assemblies may be used wherein the reflected light that impinges on the image sensor is not degraded by the optical window.

A non-conductive casing is provided for housing and protecting the imaging engine. Further still, the casing provides interconnections for transferring data between the imaging engine and circuitry of the optical code reader, and also a mounting means for attaching the imaging engine to the optical code reader. Data transfer between the imaging engine and circuitry of the optical code reader may be accomplished using electrical, optical, or wireless transfer mechanisms.

A second embodiment of the imaging engine is further disclosed wherein the base member is formed from at least one semiconductor material. In this embodiment of the imaging engine, each image sensor and each illumination assembly are integral with the base member having been formed with the base member during the fabrication process. The microprocessor, interface assembly, and interconnections between the various components are also integrally formed in the semiconductor base member. In this embodiment, the separate components of the first embodiment are incorporated into the semiconductor base member while the imaging engine functions as discussed hereinabove.

Methods of using the imaging engine of the present invention are disclosed wherein an operator, using a mobile or stationary optical code reader, aims the optical code reader at a selected optical code and the optical code is illuminated with either visible light or infrared radiation from the imaging engine. One of the outputs, a targeting beam, may be used for aligning the image sensor with the optical code. Preferably, the targeting beam is received by optical code reader and circuitry in the optical code reader automatically determines when the alignment is correct and further illuminates the optical code to generate a reflected light signal. In a manual mode of operation, the operator uses visual and/or audible indications to determine when the alignment is correct before initiating the step of generating the reflected light signal. In either mode of operation, the reflected light signal impinges on the image sensor wherein it is processed by the image sensor, a microprocessor, and circuitry in the optical code reader.

Further disclosed is an imaging system for cooperative use with an optical code reader. As with the imaging engine, the imaging system is configurable and adaptable for use with both mobile and stationary optical code readers. The imaging system of the present invention includes an imaging engine located in an optical code reader and an illumination assembly that is operatively connected to circuitry in the optical code reader. Internal and external placement of the illumination assembly is envisioned while still maintaining communication between the illumination assembly and circuitry of the optical code reader.

The illumination system includes at least one illuminating device wherein each illuminating device may be an LED, a laser, an incandescent illuminating element or a gas-filled tube. LEDs and incandescent elements are known in the art. Laser devices include semiconductor lasers such as edge-emitting injection lasers or VCSELs. Gas-filled tubes include those filled with xenon that are commonly used in electronic flash devices or other gases to generate a laser output. Preferably, the output of the illumination assembly is controlled by circuitry in the optical code reader and may include a random or repeating pattern of outputs in the visible and/or invisible light range.

BRIEF DESCRIPTION OF THE DRAWINGS

The foregoing objects and advantages of the present invention for an imaging and illumination engine may be more readily understood by one skilled in the art with reference being had to the following detailed description of preferred embodiments thereof, taken in conjunction with the accompanying drawings in which.

DETAILED DESCRIPTION OF THE PREFERRED EMBODIMENTS

Several embodiments of the present invention are hereby disclosed in the accompanying description in conjunction with the figures. Advantageously, each of the embodiments of the imaging engine is adapted to substitute for a predetermined form factor scanning engine, such as the SE900 form factor scanning engine used in many commercially available optical code readers.

Figure 1:
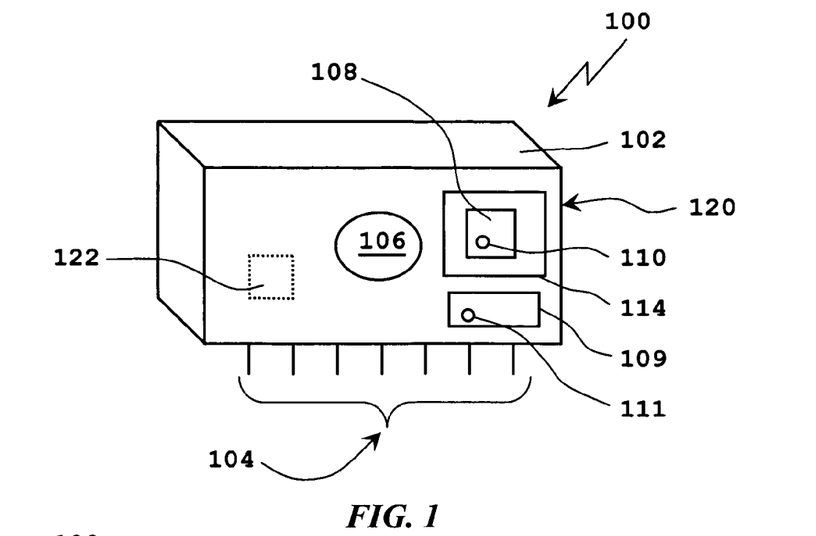
FIG. 1 is a perspective view of the imaging engine in accordance with one embodiment of the present invention.
Figure 2:
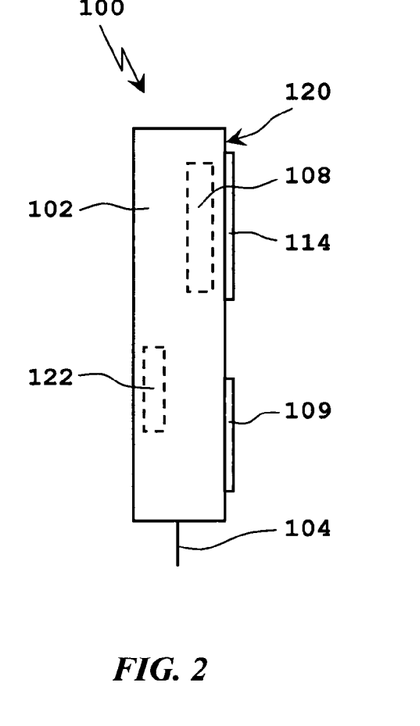
FIG. 2 is a side view of the imaging engine of FIG. 1.

Preferred embodiments of the present invention will now be described in detail with reference to the figures wherein like reference numerals identify similar or identical elements. In a first embodiment as illustrated in FIGS. 1 and 2, the imaging engine of the present invention is generally designated as 100. As used herein, the term "distal" refers to that portion that is further from the user while the term "proximal" refers to that portion that is closer to the user.

As shown in FIGS. 1 and 2, the imaging engine 100 includes a substrate 120 that includes a base member 102 and additional components of the imaging engine 100. In a first embodiment, the substrate 120 is formed from suitable non-conductive material in a generally rectangular configuration. Although the substrate is shown as a three-dimensional rectangle, alternate three-dimensional configurations that adequately house the additional components of the imaging engine 100 are envisioned as well. A plurality of cavities is formed in the base member 102 for housing additional components that include an image sensor 106 and an illumination assembly 108. Internal to the base member 102 are a plurality of passages dimensioned and configured for accommodating conductive elements that connect the image sensor 106, the illumination assembly 108, an aiming or targeting assembly 109 and an interface assembly 122.

Figure 7:
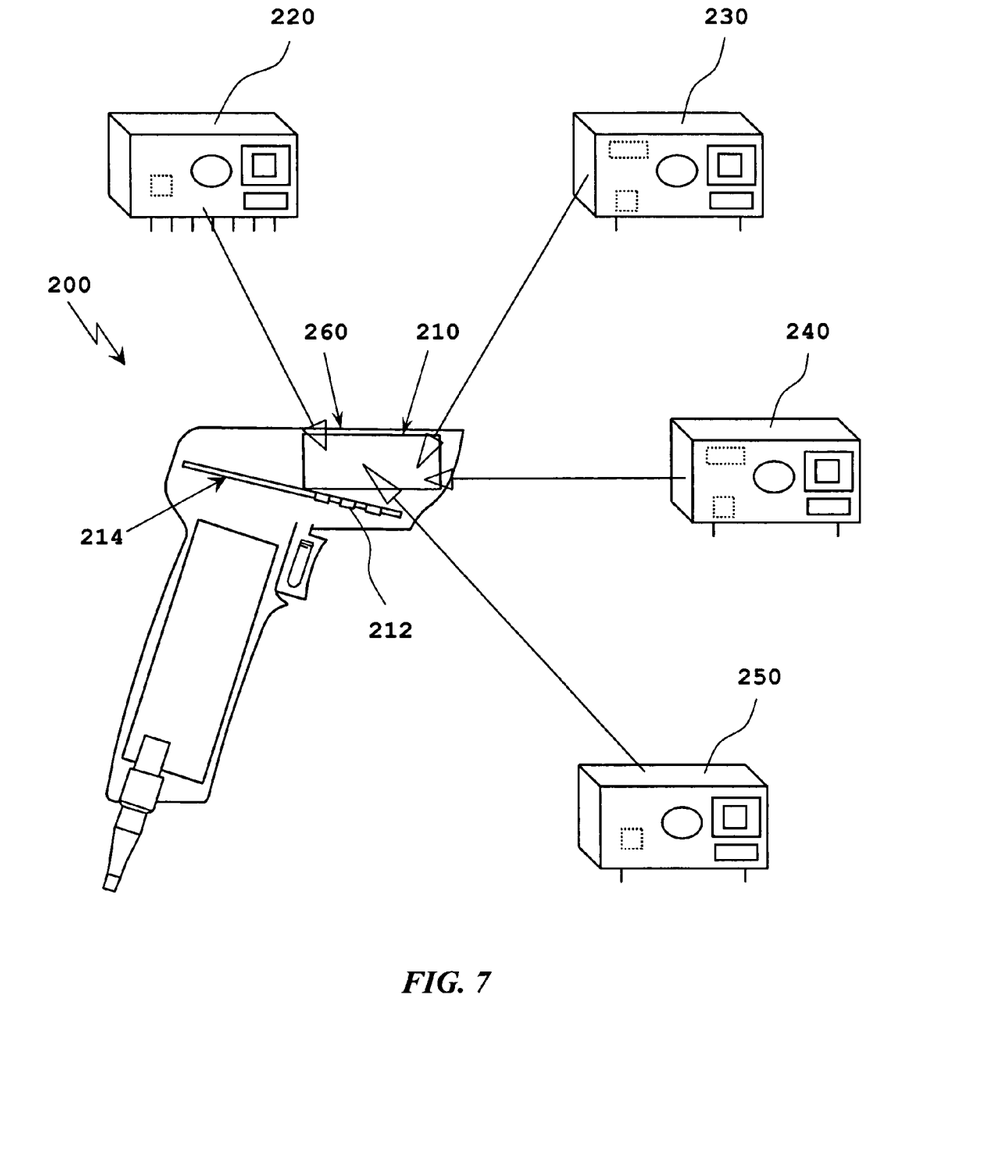
FIG. 7 is a side view of an optical code reading system according to an embodiment of the present invention.

The interface assembly 122 transfers signals between the image sensor 106 and circuitry in an optical code reader, such as optical code reader 260 shown in FIG. 7, or other optical code readers known in the art. The interface assembly 122 also transfers signals between the optical code reader 260 and the illumination assembly 108, and the optical code reader 260 and the targeting assembly 109. In addition, the interface assembly 122 may include a microprocessor that processes received data, controls the output of each illumination assembly 108, coordinates the flow of signals amongst the various circuits, and communicates with circuitry 212 in the optical code reader 260.

More than one image sensor 106, as disclosed and described in a U.S. Provisional Application assigned Ser. No. 60/437,959, filed on Jan. 3, 2003, and more than one illumination assembly 108 may be included in the imaging engine 100 depending on the intended application of the imaging engine 100. The entire contents of U.S. Provisional Application assigned Ser. No. 60/437,959, filed on Jan. 3, 2003, are incorporated herein by reference.

Additionally, image sensors 106 of different types may be employed for increasing the versatility of the imaging engine 100. Each image sensor 106 is positioned on a face of the base member 102 and is aligned with an optical beam path of the optical code reader 260 for receiving reflected light from an external target, such as a barcode or other remote indicia. Advantageously, the imaging engine 100 is configured and dimensioned to fit a predetermined form factor, such as the SE900 form factor, and can be configured and dimensioned for use in other optical code readers including mobile devices as well as stationary devices.

In a preferred configuration, the substrate 120 includes the base member 102, wherein a plurality of depressions or recesses are formed to receive a corresponding number of image sensors 106 and illumination assemblies 108. Each depression includes at least one receptacle dimensioned to receive either an image sensor 106 or an illumination assembly 108. Using receptacles in the respective depressions allows modular components to be used with the imaging engine 100. Further still, since the components are modular, the imaging engine 100 is easily configurable for different applications, easily repairable by replacing a damaged component, or easily upgradeable as improvements are made in the underlying technologies.

Advantageously, the imaging engine of the present invention is an integrated circuit (IC) package where all the components are placed on the base member 102 and integrally formed as an integrated circuit package. Prior art imaging engines required the unit including the imaging engine to be returned to the factory or other service facility for servicing resulting in increased costs and reduced flexibility of the systems employing the prior art imaging engines. However, since the imaging engine of the present invention is a plug-and-play component, the imaging engine is easily installed or removed by the end-user personnel.

With reference to FIG. 7, where an optical code reading kit is shown, if a different imaging engine is required for a particular application, the end-user merely replaces the installed imaging engine with a different imaging engine suited for the particular application. As shown in FIG. 7, an optical code reading system 200 includes the optical code reader 260 that is configured and dimensioned to receive an imaging engine conforming to a predetermined form factor. An adapter 210 is preferably located within the optical code reader 260 and is dimensioned and configured to receive the imaging engine. Further still, the adapter 210 includes circuitry and/or signal paths for communication between the imaging engine and the optical code reader 260. Preferably, the adapter 210 is a low-insertion force type of adapter to minimize damage to the leads of the imaging engine and to transfer data to the circuitry 212 provided on a logic board 214 of the optical code reader 260. Depending on the given application for the optical code reader 260, the installed imaging engine is selected from among various plug-and-play imaging engines 220, 230, 240, or 250 wherein each imaging engine is designed and adapted for reading optical targets under different conditions of lighting, distance, type of optical target, or other given optical criteria.

By way of example, if the installed imaging engine is designed and adapted for use in a system for reading remote indicia at a relatively short range and the user requires a system for reading remote indicia at a relatively long range, the user merely removes the installed imaging engine and installs a different imaging engine designed and adapted for longer ranges.

The installed imaging engine is readily removed or installed. If the installed imaging engine needs to be changed for either operational considerations, for repair, or for upgrade, the operator accesses the installed imaging engine through an access port (not shown) on the optical code reader 260 after removing power or turning the optical code reader 260 off. Since the installed imaging engine is a plug-and-play component, the operator easily removes the installed imaging engine out of the adapter 210 without the use of excess force. Next, the operator selects an imaging engine from among the other imaging engines 220, 230, 240, or 250 that is to be installed. The selected imaging engine is inserted into the adapter 210 using a minimum amount of force since the adapter 210 is a low-insertion force type adapter.

After closing the access port, the operator then turns on, or applies power to the optical code reader 260. Now the optical code reader 260 is ready for use with the replacement imaging engine. Advantageously, each plug-and-play imaging engine is configured and dimensioned for removal and/or installation within the form factor without the need for anti-static precautions. Essentially, each plug-and-play imaging engine, the adapter 210, and the optical code reader 260 are resistant to electro-static discharges therefore, no special precautions such as grounding devices are required for removal and/or insertion of the imaging engine.

Alternately, the optical code reading system 200 illustrated in FIG. 7 may be configured as a kit wherein a number of plug-and-play imaging engines are included in the kit. Each included imaging engine is configured and adapted for a particular purpose wherein each imaging engine is particularly adapted for a given set of conditions. These conditions include the type of illumination used to illuminate the target indicia, the intensity of the illumination of the target indicia, the intensity of the background illumination of the target indicia, the distance between the target indicia and the imaging engine, and the type of target indicia that is to be read.

Advantageously, the kit includes predetermined form factor optical code reader 260 and at least one imaging engine, such as imaging engine 100, where each imaging engine further includes an illumination assembly. Each supplied imaging engine is configured and dimensioned to be received by the optical code reader 260, to communicate with the circuitry 212 in the optical code reader 260, and to read a different optical quality of the target code. Thusly, the kit is flexible for accommodating a variety of lighting conditions, target codes, and/or combinations thereof.

All of the receptacles on the base member 102 transfer signal data to and from the interface assembly 122 via a plurality of electrically conductive traces formed integrally with the base member 102. It is preferred that the depressions of the base member 102 are adapted and configured such that each of the image sensors 106, illumination assemblies 108, and targeting assembly 109 are disposed substantially at or just below the outer surface of the base member 102, as shown in FIG. 2. This provides for a top surface of these components to be substantially flush with the outer surface of the base member 102.

Advantageously, the substrate 120 will be disposed in a modular package having at least one signal interface system 104 for interfacing with the circuitry 212 of the optical code reader 260. A type of signal interface system 104 that may be employed includes a plurality of electrically conductive leads that interface with a correspondingly configured receptacle in the optical code reader 260. The signal interface systems 104 also serve the function of releasably attaching the modular package to the receptacle. Other types of signal interface systems 104 that may be employed include optically interface systems or wireless interface systems.

In instances where the signal interface systems 104 do not include an attachment means for the modular package, other conventional means of securing the modular package to the optical code reader 260 can be used.

Each illumination assembly 108 includes one or more, i.e., at least one, illuminating device 110 that is operatively coupled to the interface assembly 122 via one or more of the internal conductive elements. In its simplest form, the image sensor 106 includes one illuminating device 110 for illuminating the entire field of view. This is possible, as compared to prior art imaging engines, because the imaging engine 100 is fabricated and packaged as a modular, integrated circuit package.

According to the present invention, the illuminating device 110 can be either a coherent or an incoherent light source. A preferred incoherent light source is an LED while the preferred coherent light source is a laser. Different types of lasers may be employed as an illuminating device 110, such as semiconductor lasers (including LDs). Types of semiconductor lasers include edge-emitting injection lasers or preferably, a vertical-cavity surface-emitting laser diode (VCSEL) as disclosed in U.S. Pat. No. 6,024,283 to Campanelli et al. assigned to Symbol Technologies, Inc. and is hereby incorporated by reference. Hence, when a plurality of illuminating devices 110 is disposed in each illumination assembly 108, the illumination assembly 108 includes LEDs, LDs, or a combination of LEDs and LDs.

Further, the illuminating devices 110 are preferably selected for providing a plurality of different output wavelengths of electromagnetic radiation where the majority of the output is in the visible light region. In addition, one or more of the illuminating devices 110 may provide output wavelengths in the infrared region of the electromagnetic spectrum in addition to output wavelengths in the visible light spectrum. Reflective faces may be included in each of the illumination assemblies 108 for controlling the strength of the output and/or directing the output towards a specific target that is external to the illumination assembly 108.

The output of each illumination assembly 108 directed at the optical code is returned to the optical code reader 260 as a reflected light signal that is impinged on the image sensor 106. Proper alignment of the optical code reader 260 and the optical code results in receiving a reflected light signal having a maximum intensity, thereby minimizing misreads and no-reads of the optical code or indicia.

The aiming or targeting assembly 109 located beneath the illumination assembly 108 provides for proper alignment. The targeting assembly includes one or more illuminating devices 111 for propagating a beam spot or other pattern towards the optical code during an imaging operation. The illuminating device 111 may be an LED, a laser, or other type of illuminating device known in the art.

For illumination assemblies 108, which include a plurality of illuminating devices 110, the output of the illuminating devices 110 may include different wavelengths in the visible and/or invisible light range. If all of the outputs are in visible light range, it is preferred that the respective output wavelengths of the illuminating devices 110 be in discrete ranges to provide a combined output where an observer could discern the different wavelengths which correspond to different colors of visible light. It is contemplated that when the combined output of all the illuminating devices 110 includes different wavelengths of light representing different discernable colors of light, the combined output of each illumination assembly 108 may be constant by having each illuminating device 110 emitting its particular output simultaneously.

If more than one illuminating device 110 is disposed in each illumination assembly 108, it is envisioned that each illuminating device 110 may be turned on and off independently of the other illuminating devices 110 thereby producing a random or fixed output pattern of emitted light. This random or fixed output pattern of emitted light may include infrared light as well as light within the visible light range of the electromagnetic spectrum. Further still, it is contemplated that the activation of each illumination assembly 108 may be controlled by a microprocessor in the imaging engine 100 or by the circuitry 212 in the optical code reader 260, either manually, e.g. upon depression of the trigger, or automatically.

In the imaging engine 100 where a plurality of illumination assemblies 108 is included, it is preferred that the illumination assemblies 108 are positioned about the image sensor 106 to provide optimal illumination of the target.

Additionally, the outputs of each illumination assembly 108 may be selected to illuminate a remote target that is external to the optical reader, provide an output for a focusing means, and/or provide an output for a range determining means. An example of a range determining means is disclosed in U.S. Pat. No. 6,123,264 to Li et al., the contents thereof are hereby incorporated by reference. Examples of auto-focusing means for handheld optical code readers are disclosed in U.S. Pat. Nos. 5,796,089 and 5,920,060 to Marom, the contents thereof are hereby incorporated by reference.

Illuminating the remote target preferably includes producing a targeting beam of visible light and/or infrared radiation that is usable in aligning the image sensor 106 with the optical beam path of the optical code reader 260. When the output is visible light, reflection from the optical code indicates to an operator that the image sensor 106 is correctly aligned. If infrared radiation is used for the targeting beam, visual and/or audible indications on the optical code reader 260 inform the operator that the image sensor 106 is properly aligned.

Preferably, the visible light or infrared radiation targeting beam cooperates with the circuitry 212 in the optical code reader 260 and automatically determines when the imaging sensor 106 is aligned. After the alignment is determined by the operator or the optical code reader 260, the imaging engine 100 is ready to generate an output for reading the optical code or indicia.

Advantageously, each illumination assembly 108 includes a substantially transparent optical window 114 that permits substantially all the generated output of each illuminating device 110 to be directed towards the optical target of the code reader. If the imaging engine 100 includes more than one illumination assembly 108, the optical window 114 may be of unitary construction that is configured and adapted to be disposed adjacent to each illumination assembly 108, and in particular completely covering the output port of each illumination assembly 108.

When the optical window 114 is unitarily formed, it defines a void that aligns with the image sensor 106. By locating the void in alignment with the image sensor 106, the optical window 114 will not adversely affect the light impinging on the image sensor 106 and therefore, will not degrade the received signal data. In lieu of a unitarily formed optical window 114, a plurality of optical windows 114 may be disposed on the face of the base member 102 with each optical window configured and adapted to only cover a matching illumination assembly 108. By using multiple optical windows 114 that only cover the illumination assemblies 108, the image sensor 106 will remain uncovered thereby allowing reflected light to impinge upon the image sensor 106 without any degradation resulting from an interceding optical component. Conventional means are used to attach the optical window 114 to the base member 102 of the substrate 120.

Preferably, the optical window 114 is formed from a suitable and substantially transparent optical quality glass. Typically, the selected optical quality glass will have low value of reflectance, a low value of absorptance, and a high value of transmittance. Further still, the glass may be selected to have specific optical properties such as different transmittance values for different wavelengths of light thereby allowing the illuminating devices 110 to be matched with the optical window 114 for maximum transmittance of the emitted wavelength. It is also envisioned that optical grade plastic may be substituted for glass. In the preferred embodiment, the optical window 114 is positioned substantially adjacent to the illuminating devices 110 to maximize the quantity of transmitted output and therefore minimize the amount of reflected light that can cause "flashover."

Figure 8:
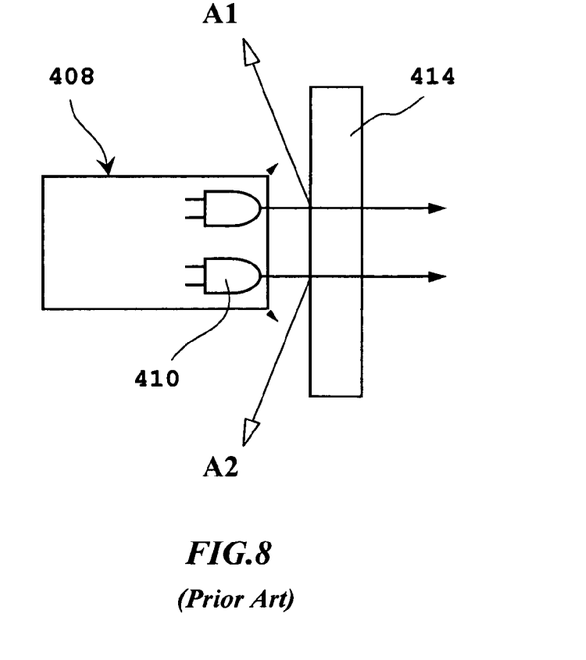
FIG. 8 is a side view of a prior art illumination assembly.

In a conventional imaging engine, there exists a gap between the output of an illuminating device and an optical window, thereby causing a part of the generated output to be reflected away from the target and generally towards the source of the output as seen in FIG. 8. Internal reflections off the optical window result in a loss of transmitted light to the target, thereby reducing the amount of light that is received by the image sensor from the target. These internal reflections also create raised levels of ambient light within the optical code reader that may interfere with distinguishing the light reflected from the target and the ambient light within the optical code reader. Overcoming these drawbacks require increasing the output of the illuminating devices and/or changing the surface materials/colors of the optical code reader to reduce the ambient light. Further still, these drawbacks result in increasing the number of misreads and no-reads of the optical code reader. By minimizing the amount of light reflected from a spaced-apart optical window, the present invention permits a higher percentage of the generated output to reach the intended target. This increases the range of the optical code reader, reduces power consumption of the optical code reader, increases accuracy and repeatability of the optical code reader, and substantially reduces the number of misreads and no-reads.

Figure 5:
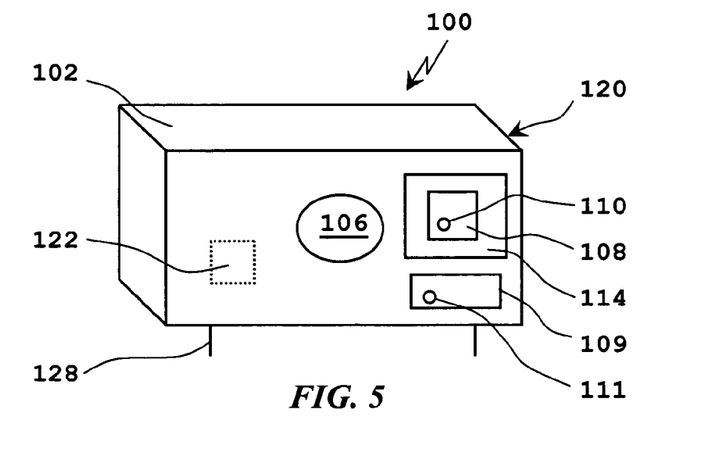
FIG. 5 is a perspective view of the imaging engine of FIG. 1 according to still another embodiment of the present invention.

Data transfer and communications between the imaging engine 100 and the optical code reader is accomplished via the signal interface system 104. In one form, the signal interface system 104 includes a number of electrically conductive elements that are accessible on at least one external location of the imaging engine 100 and therefore, are in communication with a comparably configured receptacle in the optical code reader 260 for signal data communication. Another method for interfacing the imaging engine 100 and the optical code reader 260 includes the signal interface system 104 having at least one optically conductive element 128 for exchanging data between the imaging engine 100 and the optical code reader 260 as shown in FIG. 5.

It is further contemplated that the interface between the imaging engine 100 and the optical code reader 260 may employ a wireless signal interface system for the data transfer. In a wireless configuration, signal interface system 104 includes a wireless transceiver in the imaging engine 100 and a corresponding wireless transceiver in the optical code reader 260.

Figure 3:
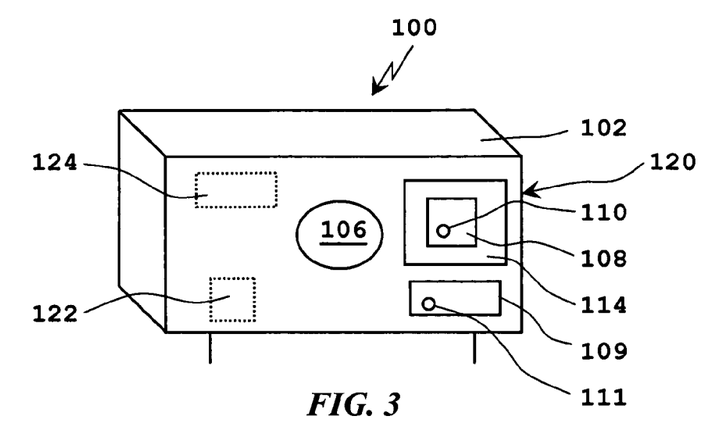
FIG. 3 is a perspective view of the imaging engine of FIG. 1 according to another embodiment of the present invention.
Figure 4:
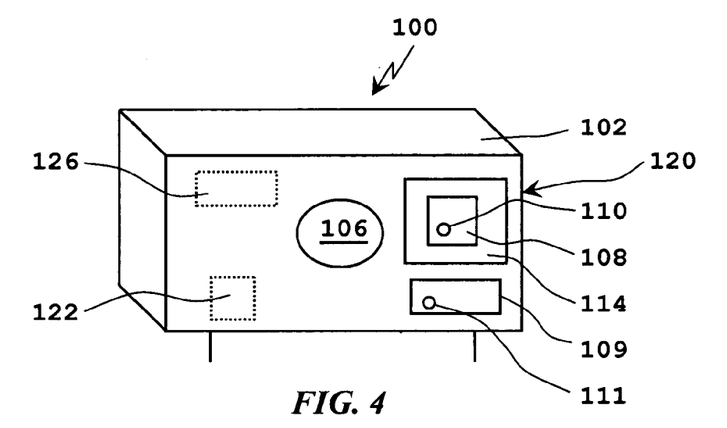
FIG. 4 is a perspective view of the imaging engine of FIG. 1 according to yet another embodiment of the present invention.

Referring to FIGS. 3 and 4, examples of wireless communications are illustrated. In the embodiment shown in FIG. 3, the imaging engine 100 includes an infrared assembly 124 that generates an infrared output. The infrared assembly 124 further includes an infrared receiver for receiving reflected infrared signals. Information contained in the reflected infrared signals is processed by the infrared assembly 124 and is transferred to the optical code reader 260 through the interface assembly 122. Data from the optical code reader 260 is transferred to the imaging engine 100 via the interface assembly 122. For maximum flexibility and compatibility, infrared communications and data transfers preferably follow protocols established by the Infrared Data Association (IRDA).

An alternate wireless communication means is shown in FIG. 4 wherein the imaging engine 100 includes a radio-frequency assembly 126. Radio-frequency transmission and reception mechanisms are included in the radio-frequency assembly 126 along with other signal processing systems. Radio-frequency assembly 126 transmits and receives information in the form of radio waves. Information processed by the radio-frequency assembly 126 is transferred to the optical code reader 260 through the interface assembly 122.

In an alternate embodiment of the imaging engine 100, the base member 102 is a semiconductor formed from one or more semiconductor materials that are known in the art. As discussed previously, the base member 102 includes at least one image sensor 106 and at least one illumination assembly 108. Each illumination assembly 108 further includes at least one illuminating device 110 wherein each illuminating device 110 is either an LED or a semiconductor laser. Preferably, the semiconductor laser is a LD such as the VCSEL type.

Since the base member 102 is a semiconductor, each imaging engine 100, including the image sensors 106 and the illumination assemblies 108, can be manufactured as a discrete component that is packaged in a non-conductive casing having at least one signal interface system 104 that interconnects the imaging engine 100 with the optical code reader 260.

Each illumination assembly 108 generates a number of outputs that are determined by the number of illuminating devices 110 included in each illumination assembly 108. One or more of the outputs may be in the infrared range for illumination of the target, supplying an output for a range determining means, supplying an output for an auto-focusing means, or supplying an output for transferring signal data to the optical code reader 260. Alternately, the illumination assembly 108 may produce one or more outputs in the visible light range as discussed in the previous embodiment. However, the LEDs and/or LDs of the previous embodiment were discrete components disposed in the base member 102. In this embodiment, the LEDs and LDs are formed in the semiconductor base member 102 wherein their outputs are directed towards one or more faces of the imaging engine 100 depending on their function.

By way of example only, an illumination assembly 108 may include an infrared LED, a red LED, and a red LD formed as integral components of the semiconductor base member 102. In this example, the output of the infrared LED may be oriented to transmit data signals to a corresponding infrared receiver in the optical code reader 260, while the red LED may be positioned so that its output is directed in a different direction for illuminating a remote target and the red LD is oriented in the same direction as the red LED.

Although it may seem redundant to have both the red LED and the red LD outputs oriented in the same direction, operational considerations may require the use of the red LED in certain circumstances while the red LD is preferred under different conditions for the same optical code reader. The output of each illumination assembly 108 that is directed at the optical code is returned to the optical code reader 260 as the reflected light signal that impinges on the image sensor 106. Proper alignment of the optical code reader 260 and the optical code results in a reflected light signal with its maximum intensity thereby minimizing misreads and no-reads of the optical code.

Interconnections among the image sensor 106, the illumination assembly 108, and signal interface system 104 for transferring signal data are incorporated into the semiconductor base member 102 during manufacturing and are therefore integral to the imaging engine 100. As in the previous embodiment, the interconnections permit signals to be transferred between the image sensor 106 and the optical code reader 260 via the signal interface system 104 and between the illuminating devices 110 that are included in the illumination assembly 108 and the optical code reader 260 through the signal interface system 104.

Data transfer and communications between the imaging engine 100 and the optical code reader 260 is accomplished via the signal interface system 104. In one configuration, signal interface system 104 includes a number of electrically conductive elements that are accessible on at least one external location of the imaging engine 100 and therefore are in communication with a comparably configured receptacle in the optical code reader 260 for signal data communication. Additionally, the conductive elements of the signal interface system 104 releasably attach the imaging engine 100 to the receptacle in the optical code reader 260.

Another method for interfacing the imaging engine 100 and the optical code reader 260 includes providing signal interface system 104 with at least one optical interface system for exchanging data between the imaging engine 100 and the optical code reader 260. It is further contemplated that the interface between the imaging engine 100 and the optical code reader 260 may employ a wireless signal interface system 104 for the data transfer. In a wireless configuration, signal interface system 104 includes a wireless transceiver in the imaging engine 100 and a corresponding wireless transceiver in the optical code reader 260. Examples of wireless communication media include radio-frequency communications and infrared communications. Conventional methods for releasably attaching the imaging engine 100 to the optical code reader 260 are envisioned when the signal interface system 104 includes optically conductive elements or a wireless arrangement.

In lieu of a unitarily formed optical window 114, a plurality of optical windows 114 may be disposed on the face of the base member 102 with each optical window configured and adapted to only cover a matching illumination assembly 108. By using multiple optical windows 114 that only cover the illumination assemblies 108, the image sensor 106 will remain uncovered, thereby allowing reflected light to impinge upon the image sensor 106 without any degradation resulting from an interceding optical component. Conventional means are used to attach the optical window 114 to the base member 102 of the substrate 120.

Preferably, the optical window 114 is formed from a suitable and substantially transparent optical quality glass.

Typically, the selected optical quality glass will have low value of reflectance, a low value of absorptance, and a high value of transmittance. Further still, the glass may be selected to have specific optical properties, such as different transmittance values for different wavelengths of light, thereby allowing the illuminating devices 110 to be matched with the optical window 114 for maximum transmittance of the emitted wavelength. It is also envisioned that optical grade plastic may be substituted for glass. In the preferred embodiment, the optical window 114 is positioned substantially adjacent to the illuminating devices 110 to maximize the quantity of transmitted output, and therefore minimize the amount of reflected light.

In a conventional imaging engine 408, there exists a gap between the output of an illuminating device 410 and an optical window 414, thereby causing a part of the generated output to be reflected away from the target and generally towards the source of the output, as shown by arrows "A1" and "A2" in FIG. 8. Internal reflections off of the optical window 414 result in a loss of transmitted light to the target, thereby reducing the amount of light that is received by the image sensor from the target and also create raised levels of ambient light within the optical code reader that may interfere with distinguishing the light reflected from the target and the ambient light within the optical code reader. Overcoming these drawbacks require increasing the output of the illuminating devices 410 and/or changing the surface materials/colors of the optical code reader to reduce the ambient light. Further still, these drawbacks result in increasing the number of misreads and no-reads of the optical code reader.

By minimizing the amount of light reflected from a spaced apart optical window, the present invention permits a higher percentage of the generated output reaches the intended target therefore increasing the efficiency of the imaging engine that allows for increased range of the optical code reader, reduced power consumption of the optical code reader, or increased accuracy and repeatability of the optical code reader due to minimizing the number of misreads and no-reads of the optical code reader.

A method of using either embodiment of the imaging engine 100 is hereinafter disclosed. Maximum flexibility is achieved since either embodiment is configurable and adaptable for use in both mobile and stationary optical code readers. Reading a remote target indicium using the imaging engine 100 of the present invention includes the following steps. An operator using the optical code reader 260 which includes the imaging engine 100 aims the optical code reader 260 at the desired remote optical target such as a barcode located on an object. Aiming the optical code reader 260 may include actuating a targeting beam of light (including infrared radiation).

The targeting beam of light is generated and propagated by the targeting assembly 109. The targeting beam of light, in conjunction with the circuitry 212 in the optical code reader 260, indicates to the operator that the image sensor 106 is properly aligned with the optical beam path of the optical code reader 260. Once aligned, the image sensor 106 receives the maximum quantity of the reflected light signal from the targeted optical code. An indication that the image sensor 106 is properly aligned includes visual observation of the targeting beam of light on the optical code.

In addition, the optical code reader 260 may generate visual and/or audible indications when using visible light or infrared radiation as the targeting beam. By properly aligning the image sensor 106 with the reflected light signal in this manner, the imaging engine 100 minimizes the number of misreads and no-reads of the optical code. Once the image sensor 106 is properly aligned, the operator initiates the acquiring function of the optical code reader 260. Preferably, the targeting beam cooperates with the circuitry 212 in the optical code reader 260 to determine when the image sensor 106 is properly aligned and automatically initiates the acquiring function of the optical code reader 260.

Acquiring the optical code includes actuating the illumination assembly 108 to illuminate the optical code by generating at least one output by the one or more illuminating devices 110. Each output is preferably in the visible light range corresponding to a particular color of discernable light or in the infrared region of the electromagnetic spectrum. The output can be determined by the optical code to be read and the design of the image sensor 106 that is included in the imaging engine 100. Since the image sensor 106 is aligned to receive the reflected light signal, the image sensor 106 receives the maximum impingement of the reflected light signal. The image sensor 106 processes the reflected light signal and converts the data contained within the reflected light signal into a data signal that is transferred to the circuitry 212 within the optical code reader 260.

Figure 6:
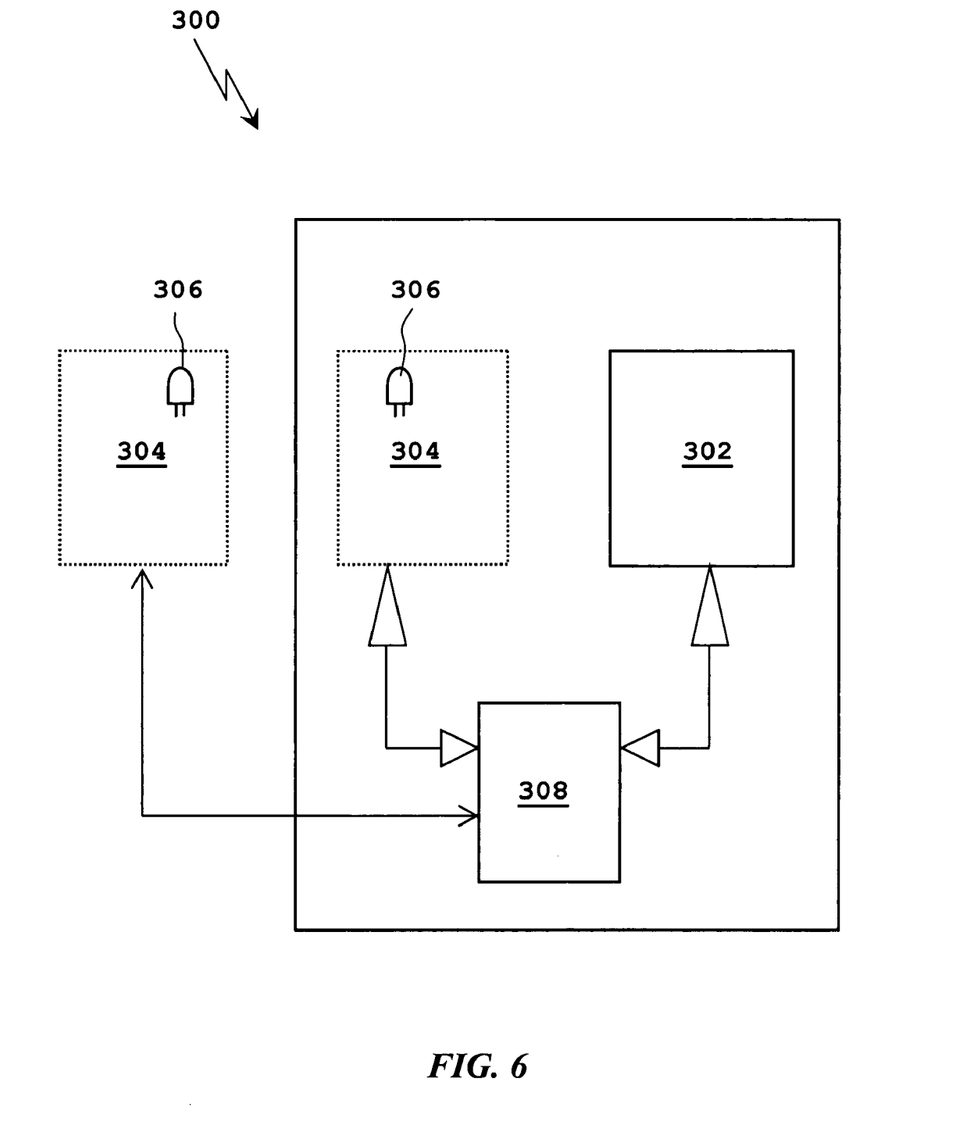
FIG. 6 is block diagram of an imaging system according to the present invention.

An imaging system 300 according to the present invention is hereinafter disclosed with reference to the block diagram of FIG. 6. The imaging system 300 includes an imaging engine 302 and an illumination assembly 304. Furthermore, the imaging system 300 is configured and dimensioned to fit within a predetermined form factor, such as the SE900 form factor. The imaging engine 302 may be one of the types already known in the art or it may be one of the types previously disclosed in the instant application. In addition, the illumination assembly 304 of the imaging system 300 may be integral with the imaging engine 302 as previously disclosed, or, preferably is a separate component that is configured and adapted to cooperate with the selected imaging engine 302. When the illumination assembly 304 is a separate component it may be placed inside the optical code reader 260 or externally attached to the optical code reader 260. In both of the above-mentioned configurations, the illumination assembly 304 interfaces with the circuitry 212 of the optical code reader 260 and/or the imaging system 300.

Preferably, the imaging system 300 is controlled by a microprocessor 308. The microprocessor 308 is included in the imaging system 300, as shown in FIG. 6, or may be external to the imaging system 300. The microprocessor 308 has communication data paths between (1) itself and the illumination assembly 304, (2) itself and the circuitry 212 in the optical code reader 260, and (3) itself and the imaging engine 302. Preferably, the microprocessor 308 controls the illumination assembly 304 and the imaging engine 302.

Each illumination assembly 304 includes at least one illuminating device 306. Each illuminating device 306 is selected from the group consisting of LEDs, lasers, incandescent illuminating elements, and gas-filled tubes. LEDs and incandescent illuminating elements are known in the art, while lasers include semiconductor edge-emitting injection lasers or VCSELs. Illuminating elements 306 of the gas-filled tube type include those filled with a gas, such as xenon, that is typically used in electronic flash devices.

In the imaging system 300 of the present invention, the illumination assembly 304 may disposed adjacent to the imaging engine 302 or may be disposed in another location of the optical code reader 260. These alternate locations for the illumination assembly 304 include the interior and the exterior of the optical code reader 260 with each location providing an interface between the illumination assembly 304 and the microprocessor for transferring signal data.

Regardless of its location relative to the imaging engine 302, the illumination assembly 304 is disposed so that its output illuminates a selected target and the light reflected from the target is received by the optical code reader 260 and, more particularly, the imaging engine 302 of the optical code reader 260. Additionally, the optical code reader 260 may include a means for auto-focusing and/or a means for determining the distance between the optical code reader 260 and a target. In these instances, the output from the illumination assembly 304 may be used to supply some or all of the incident light used in conjunction with a distance determining means and/or an auto-focusing means.

Alternately, the illumination assembly 304 includes a plurality of illuminating devices 306 whose output is substantially in the visible light range. In this configuration, the illumination assembly 304 has an output that includes several different wavelengths in the visible light range. If all of the outputs are in visible light range, it is preferred that the respective output wavelengths of the illuminating devices 306 be in discrete ranges to provide a combined output where an observer is able to distinguish between the different wavelengths that correspond to different colors of visible light.

When the total output of all the illuminating devices 306 includes different wavelengths of light representing different discernable colors of light, the total output of each illumination assembly 304 may be constant in that each illuminating device 306 emits its particular output simultaneously. If more than one illuminating device 306 is disposed in each illumination assembly 304, it is envisioned that each illuminating device 306 may be turned on and off independently of the other illuminating devices 306, thereby producing a random or repeating output pattern of emitted light. This random or repeating output pattern of emitted light may include infrared light as well as light within the visible light range of the electromagnetic spectrum.

A method of using the imaging system 300 is hereinafter disclosed. Maximum flexibility is achieved since the imaging system 300 is configurable and adaptable for use in both mobile and stationary optical code readers. Reading a remote target indicium using the imaging system 300 of the present invention includes the following steps. An operator using an optical code reader, such as the optical code reader 260, that includes the imaging system 300 aims the optical code reader at the desired remote optical target such as a barcode located on an object. Aiming the optical code reader may include actuating a targeting beam of light (including infrared radiation) using an aiming and targeting assembly, such as aiming and targeting assembly 109, that, in conjunction with circuitry in the optical code reader, such as circuitry 212, indicates to the operator that the imaging engine 302 is aligned with the optical beam path of the optical code reader and therefore, is aligned to receive the maximum quantity of the reflected light signal from the target optical code. Indication that the imaging engine 302 is correctly aligned includes visual observation of the targeting beam on the optical code. In addition, the optical code reader may generate visual and/or audible indications when using visible light or infrared radiation as the targeting beam. By properly aligning the imaging engine 302 with the reflected light signal in this manner, the illumination assembly 300 minimizes the number of misreads and no-reads of the optical code.

After the imaging engine 302 is properly aligned, the operator initiates the acquiring function of the optical code reader. Preferably, the targeting beam cooperates with the circuitry in the optical code reader to determine when the imaging engine 302 is properly aligned and automatically initiates the acquiring function of the optical code reader.

Acquiring the optical code includes actuating the illumination assembly 304 to illuminate the optical code by generating at least one output. Each output may be a range of wavelengths in the visible light range corresponding to a particular color of discernable light or may be in the infrared region of the electromagnetic spectrum. The output that is selected is determined by the optical code to be read and the design of the imaging engine 302 that is included in the imaging system 300. Since the imaging engine 302 is still aligned to receive the reflected light signal, the imaging engine 302 receives the maximum impingement of the reflected light signal. The imaging engine 302 processes the reflected light signal and converts the data contained in the reflected light signal into a data signal that is transferred to the circuitry in the optical code reader.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. A plug-and-play imaging engine configured and dimensioned to fit within a predetermined form factor of an optical code reader having a housing and circuitry therein, said imaging engine comprising:
   an imaging assembly including at least one image sensor;
   at least one illumination assembly having at least one illuminating device, the at least one image sensor and the at least one illuminating device being provided on a substrate including portions for placement of the image sensor and the illumination assembly, wherein the image sensor and the illumination assembly are substantially flush with an outer surface of the substrate upon placement within their respective portions; and
   an interface having at least one signal path configured for providing at least one control signal to the imaging assembly, wherein the at least one control signal is generated and transmitted to the interface of said plug-and-play imaging engine by said circuitry housed within said housing for operating said imaging assembly and at least one illumination assembly.

2. The imaging engine of claim 1, wherein the at least one signal path transfers the at least one control signal between the imaging assembly and circuitry of the optical code reader.

3. The imaging engine of claim 2, wherein the at least one signal path is selected from the group consisting of an electrical, an optical, and a wireless path.

4. The imaging engine of claim 1, wherein said imaging engine is an integrated circuit package.

5. The imaging engine of claim 1, wherein the at least one image sensor is configured for being positioned in an optical beam path of the optical code reader.

6. The imaging engine of claim 1, further comprising a transmissive optical element overlaying the outer surface of the substrate.

7. The imaging engine of claim 1, wherein said substrate is a semiconductor.

8. The imaging engine of claim 1, wherein the at least one illuminating device includes at least two light-emitting diodes providing at least two different output wavelengths.

9. The imaging engine of claim 1, wherein the at least one illuminating device is selected from the group consisting of an LED, a semiconductor laser, and a flash module.

10. The imaging engine of claim 1, further comprising a targeting assembly, wherein the at least one signal path provides at least one control signal to the targeting assembly.

11. An optical code reading system for imaging an optical target, said system comprising:
an optical code reader; and
a plug-and-play imaging engine having structure for removably connecting to the optical code reader, an interface for interfacing and communicating with internal circuitry of said optical code reader and for receiving at least one control signal from said internal circuitry when said imaging engine is connected to the optical code reader for operating said plug-and-play imaging engine, an imaging sensor in operative communication with said interface, and an illumination assembly including at least one illuminating device, wherein the image sensor and the illumination assembly are provided on a single substrate and are substantially flush with an outer surface of the substrate, and an illumination assembly including at least one illuminating device.

12. The optical code reading system of claim 11, wherein the at least one illuminating device includes a plurality of light-emitting diodes having an output of at least two different wavelengths, said illumination assembly communicating with circuitry of said optical code reader via said interface.

13. The optical code reading system of claim 11, wherein the imaging engine includes a transmissive optical element located on a face of said imaging engine.

14. The optical code reading system of claim 11, wherein said imaging engine is an integrated circuit package.

15. The optical code reading system of claim 11, wherein said imaging engine further includes a targeting assembly, said image sensor and targeting assembly communicating with circuitry of said optical code reader via said interface.

16. The optical code reading system of claim 11, further comprising another imaging engine configured for being interchanged with the imaging engine.

17. A method for reading an optical code using an optical code reader having a housing and circuitry therein, said method comprising:
placing a plug-and-play imaging engine having an interface within a form factor of the optical code reader, wherein the interface interfaces the plug-and-play imaging engine with said circuitry housed within the housing of the optical code reader, said plug-and-play imaging engine further having an image sensor and an illumination assembly provided on a single substrate and being substantially flush with an outer surface of the substrate;
aiming the optical code reader at the optical code;
activating the optical code reader to generate and propagate at least one control signal to the plug-and-play imaging engine from the circuitry for operating said imaging engine for generating at least one signal output from at least one illuminating device of the imaging engine, the at least one signal output is reflected by the optical code to produce at least one reflected signal;
impinging the at least one reflected signal onto an image sensor; and
processing the at least one reflected light signal to generate an output data signal.

18. The method of claim 17, wherein the step of activating the optical code reader includes the step of transmitting a control signal to the illumination assembly having the at least one illuminating device to generate and propagate the at least one signal output.

19. The method of claim 17, wherein at least the at least one illuminating device and the image sensor form an integrated circuit package.

20. An optical code reading kit, said kit comprising:
an optical code reader; and
at least two plug-and-play imaging engines configured and dimensioned for alternative placement within a form factor of the optical code reader, said at least two plug-and-play imaging engines having respective substrates, at least one of said at least two plug-and-play imaging engines having an illumination assembly and an image sensor provided on its respective substrate, the imaging sensor and the illumination assembly being substantially flush with an outer surface of the respective substrate, the substrates having interfaces for communicating with circuitry of said optical code reader, wherein the respective interfaces include at least one signal path configured for providing at least one control signal to the substrate for operating said plug-and-play imaging engine within said form factor.

21. The optical code reading kit of claim 20, wherein the illumination assembly of said at least one of the at least two imaging engines has at least one illuminating device at least one illuminating device.

22. A method for changing an imaging engine in an optical code reader comprising:
removing a first, plug-and-play imaging engine from the optical code reader by disconnecting said first, plug-and-play imaging engine from the optical code reader; and
interfacing a second, plug-and-play imaging engine to the optical code reader, wherein first and second plug-and-play imaging engines are dimensioned to fit within a substantially identical form factor of the optical code reader and further wherein first and second plug-and-play imaging engines include an interface having at least one signal path configured for providing at least one control signal to the imaging engine, wherein the interface interfaces the plug-and-play imaging engine with circuitry of the optical code reader; wherein the circuitry of the optical code reader is configured for generating and transmitting the at least one control signal for operating said second plug-and-play imaging engine, at least one of the first and second plug-and-play imaging engines has an image sensor and an illumination assembly provided on a single substrate, the imaging sensor and the illumination assembly being substantially flush with an outer surface of the substrate.

23. The method according to claim 22, wherein each of the first and second plug-and-play imaging engines are integrated circuit packages having an illumination assembly including one illuminating device.

24. The method according to claim 22, wherein each of the first and second plug-and-play imaging engines have a transparent overlay overlaying at least one surface thereof.

25. The method according to claim 22, wherein each of the first and second plug and-play imaging engines are integrated circuit packages having an illumination assembly including a plurality of illuminating devices for emitting an output having at least two different wavelengths.

26. A plug-and-play imaging engine, integrated circuit package comprising:
- a substrate;
- an image sensor disposed on said substrate;
- an illumination assembly disposed on said substrate having at least one illumination device, wherein the at least one illumination device and the image sensor are substantially flush with an outer surface of the substrate;
- an optical element overlaying the at least one illumination device; and
- an interface having at least one signal path configured for providing at least one control signal to the substrate, wherein the interface is configured to interface the plug-and-play imaging engine with circuitry housed within an optical code reader for receiving at least one control signal from said circuitry for operating said image sensor and illumination assembly.

27. The package of claim 26, further comprising a targeting assembly having at least one illumination device substantially flush with the outer surface of the substrate.

28. The package of claim 26, wherein said package is configured and dimensioned to fit within a predetermined form factor of an optical code reader, and wherein said package is a plug-and-play component.

29. The package of claim 26, further comprising interface means for interfacing the image sensor and the illumination assembly with circuitry of an optical code reading system.

* * * * *

UNITED STATES PATENT AND TRADEMARK OFFICE
CERTIFICATE OF CORRECTION

| | | |
|---|---|---|
| PATENT NO. | : 7,044,377 B2 | Page 1 of 1 |
| APPLICATION NO. | : 10/633061 | |
| DATED | : May 16, 2006 | |
| INVENTOR(S) | : Patel et al. | |

It is certified that error appears in the above-identified patent and that said Letters Patent is hereby corrected as shown below:

Column 17:

lines 22-24:

Remove "..., and an illumination assembly including at least one illuminating device"

lines 64-65:

"impinging the at least one reflected signal onto an image sensor; and" should be
-- impinging the at least one reflected signal onto said image sensor; and --

Column 18:

Claim 21, lines 28-29:

Remove "at least one illuminating device"

Claim 22, line 53:

Change "...the imaging sensor and the illumination assembly being..." to
-- ...the image sensor and the illumination assembly being... --

Signed and Sealed this

First Day of August, 2006

JON W. DUDAS
*Director of the United States Patent and Trademark Office*